(12) United States Patent
Swingley

(10) Patent No.: US 12,070,640 B2
(45) Date of Patent: *Aug. 27, 2024

(54) PIPE FITTING INCORPORATING A SPHERICAL SPIN WELD

(71) Applicant: Spears Manufacturing Co., Sylmar, CA (US)

(72) Inventor: Douglas Swingley, Agua Dulce, CA (US)

(73) Assignee: Spears Manufacturing Co., Sylmar, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/992,206

(22) Filed: Nov. 22, 2022

(65) Prior Publication Data

US 2023/0084140 A1   Mar. 16, 2023

Related U.S. Application Data

(63) Continuation of application No. 16/587,020, filed on Sep. 29, 2019, now Pat. No. 11,534,640.

(51) Int. Cl.
| | | |
|---|---|---|
| *A62C 35/68* | (2006.01) |
| *A47L 9/24* | (2006.01) |
| *B21K 1/16* | (2006.01) |
| *B29C 65/06* | (2006.01) |
| *F16L 47/02* | (2006.01) |

(52) U.S. Cl.
CPC .............. *A62C 35/68* (2013.01); *A47L 9/242* (2013.01); *B21K 1/16* (2013.01); *B29C 65/0672* (2013.01); *F16L 47/02* (2013.01)

(58) Field of Classification Search
CPC .......... F16L 47/02; F16L 47/03; A62C 35/68; B29C 65/0672
See application file for complete search history.

(56) References Cited

U.S. PATENT DOCUMENTS

| | | | |
|---|---|---|---|
| 2,933,428 A | 4/1960 | Mueller | |
| 3,663,043 A | 5/1972 | Walton | |
| 4,047,739 A | 9/1977 | Aitken | |
| 4,365,669 A * | 12/1982 | Wagner | B29C 66/1224 210/497.1 |
| 4,712,809 A | 12/1987 | Legris | |
| 5,239,944 A | 8/1993 | Hostetler | |
| 5,284,367 A * | 2/1994 | Yano | F16L 27/113 285/146.1 |
| 7,712,793 B1 | 5/2010 | Garraffa | |
| 8,566,976 B2 | 10/2013 | Evans et al. | |

(Continued)

FOREIGN PATENT DOCUMENTS

EP    1990514 A1 * 11/2008  .......... F01N 13/1811

*Primary Examiner* — David Bochna
(74) *Attorney, Agent, or Firm* — Irell and Manella LLP

(57) ABSTRACT

A two-piece connection between a supply pipe from a source of water and a connection to a fire sprinkler with the connector having a first or rear section entirely above a ceiling and a second or front section connected to the first section with the connection entirely above a ceiling and the forward portion of second section connected to the fire sprinkler. The first connector section, located entirely above a ceiling, has a spherical male sidewall with a rounded leading edge and a rear portion of the second connector section has a spherical female interior surface.

15 Claims, 11 Drawing Sheets

(56) References Cited

U.S. PATENT DOCUMENTS

| | | | |
|---|---|---|---|
| 11,534,640 B1* | 12/2022 | Swingley | F16L 47/02 |
| 2006/0076773 A1* | 4/2006 | Baharav | B29C 65/3432 |
| | | | 285/146.1 |
| 2007/0046023 A1* | 3/2007 | Hung | F16L 27/04 |
| | | | 285/261 |
| 2009/0139735 A1 | 6/2009 | Orr | |
| 2015/0292664 A1 | 10/2015 | Mann et al. | |
| 2019/0217137 A1 | 7/2019 | Senecal et al. | |
| 2019/0374802 A1 | 12/2019 | Coletta et al. | |

* cited by examiner

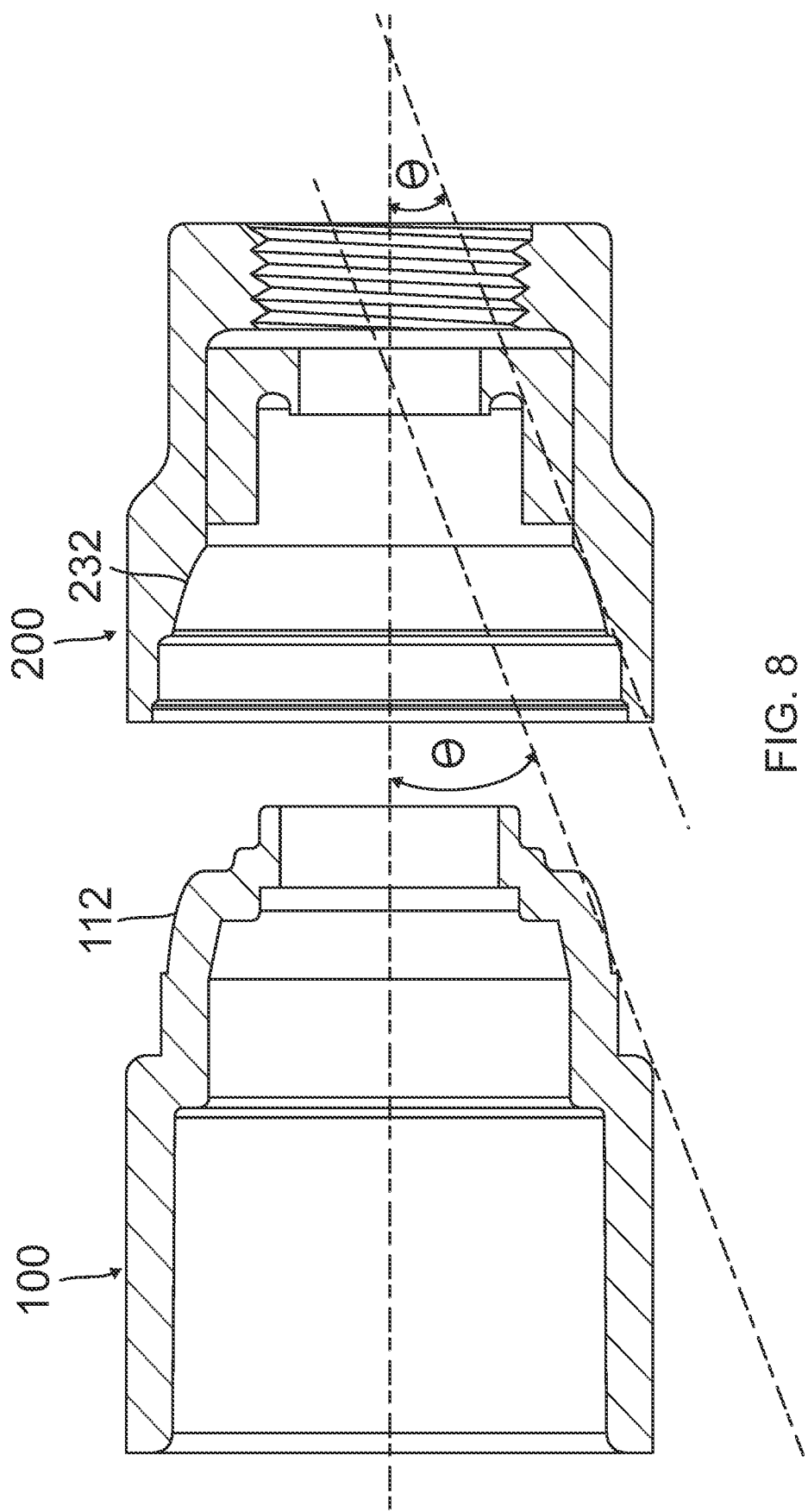

PIPE FITTING INCORPORATING A SPHERICAL SPIN WELD

PRIORITY CLAIM AND RELATED APPLICATIONS

This application is a continuation of and claims priority under 35 U.S.C. § 120 to U.S. patent application Ser. No. 16/587,020, filed Sep. 29, 2019, entitled "PIPE FITTING INCORPORATING A SPHERICAL SPIN WELD," the entirety of which is expressly incorporated herein by reference.

BACKGROUND OF THE INVENTION

1. Field of the Invention

The present invention relates to the field of assembling articles by a process known as friction welding where two pieces of plastic are fused together to form a fire sprinkler plumbing fitting.

2. Background

Friction welding is a practice of assembling two parts constructed of similar materials by holding the two parts together and by rubbing them against each other until they melt. The two parts are then held after melting until the two melted parts cool. After the two melted parts have cooled, they become completely fused. In general, the process of rubbing the two parts together is most commonly performed by rotating one part against the other part. This is also known as"spin welding". However, this process can also be achieved with non-circular sections by sliding a surface of one part against a surface of another part until the two parts are melted together as just described.

Pipe fittings, also known as "pipe connections", are used to convey the flow of water from a source of water to a fire water sprinkler head. Such pipe connections have traditionally included at least one connection joint that adapts the pipe to a fire sprinkler head. These pipe fittings are referred to as "head adapters". The head adapter joins the fire sprinkler head to a water supply pipe by a threaded pipe connection. There are several different fitting designs which offer various unique features for creating a watertight seal between pipes. Some such fitting designs use elastomeric gaskets. Some such pipe designs use O-rings. Other pipe designs use just pipe threads and sealant. Regardless of which process is used, all such fitting designs must make a watertight seal from the supply pipe to the sprinkler head. Gasketed head adapters are preferred because of their low installation torque, elimination of threaded sealants and exceptional sealing ability. A critical element of such head fitting designs is that head adapters are located above a finished ceiling, making replacement or correction of a non-watertight seal difficult and expensive.

Fire sprinkler systems protect life and property, making their placement critical and proximate to flammable valuables. In the event of a leak, significant property damage can result.

Therefore, there is a significant need for an improved connection between a supply pipe from a source of water and a connection to a fire water sprinkler which is leakproof when the connection is partially out of sight and above a ceiling.

SUMMARY OF THE INVENTION

Fire sprinkler plumbing is constructed of several different materials, steel being the most common. However, other metals such as copper and plastic including cross linked polyethylene and chlorinated polyvinyl ("CPVC") are also used. CPVC is gaining in popularity because of its lower cost, ease of installation, corrosion resistance, and flow capability.

A gasketed plastic (CPVC) combines the most desirable features for a fire sprinkler system component. The design of gasketed head adapters needs to be such that the gasket is completely captured so that in operation, with the flow of water, the gasket cannot move and impede the delivery of water. In the present invention, the most efficient way to assure that the gasket will not move and is completely captured between two adjoining pieces is for the two halves to be friction welded together to create a permanent leakproof one-piece shell. Therefore, the friction welded one-piece shell into which the gasket is captured will assure that the gasket will not move and provide the leakproof connection.

The present invention is an improved gasketed head adapter with the body constructed of two separate pieces. The body of the head adapter is comprised of two CPVC pieces that are permanently connected around the sealing gasket. The present invention spin weld process is used to join the two plastic body halves together.

It is an object of the present invention to provide a connection between the first section and the second section retaining the gasket between the two sections which is leakproof when spin welded together in accordance with the present invention.

Conventional spin weld joint designs incorporate cylindrical, conical or flat planer surfaces. It has been discovered, in accordance with the present invention, that if the two pieces are not aligned exactly in a straight manner along the axis of joinder, the joint integrity is compromised and could result in a leak. It is therefore a key innovation of the present invention to use a spherical shape on both sides of the joint. This solves the problem of a potential leak even if the two halves are not joined in perfect alignment. As a result, by having two spherical halves which are joined together through the present invention spin welding process, this innovation allows for a large angular mis-alignment. Essentially, the design of two spherical halves is the equivalent of a ball inside a ball which are spin welded together. Each of two spherical halves is of similar size such that when spin welding one section to another, the mating surfaces maintain a large degree of simultaneous contact, creating a substantial weld.

The present invention spin welding two components together, each of which has a spherical shape for the benefit as described above is a component of a fire sprinkler system which includes a pipe connecting a supply of water connected to a fire water sprinkler head.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 8 is a cross-sectional view of both sections showing the angle of the chord of the circular section of the sphere to the center of the sections.

DETAILED DESCRIPTION OF EMBODIMENTS OF THE INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
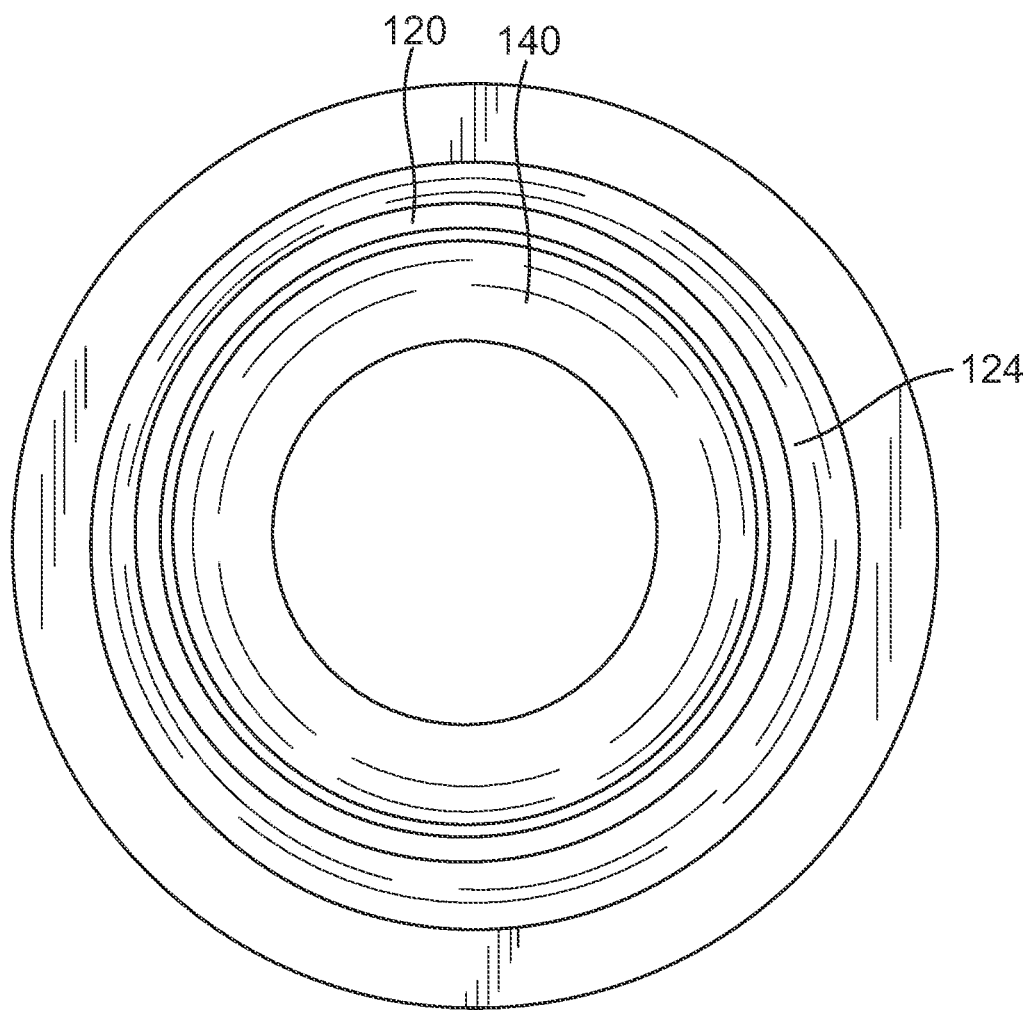
FIG. 1 is a front plan view of the front portion of the first section of the present invention connector, the front portion including a spherical male exterior surface with a rounded leading edge.
Figure 2:
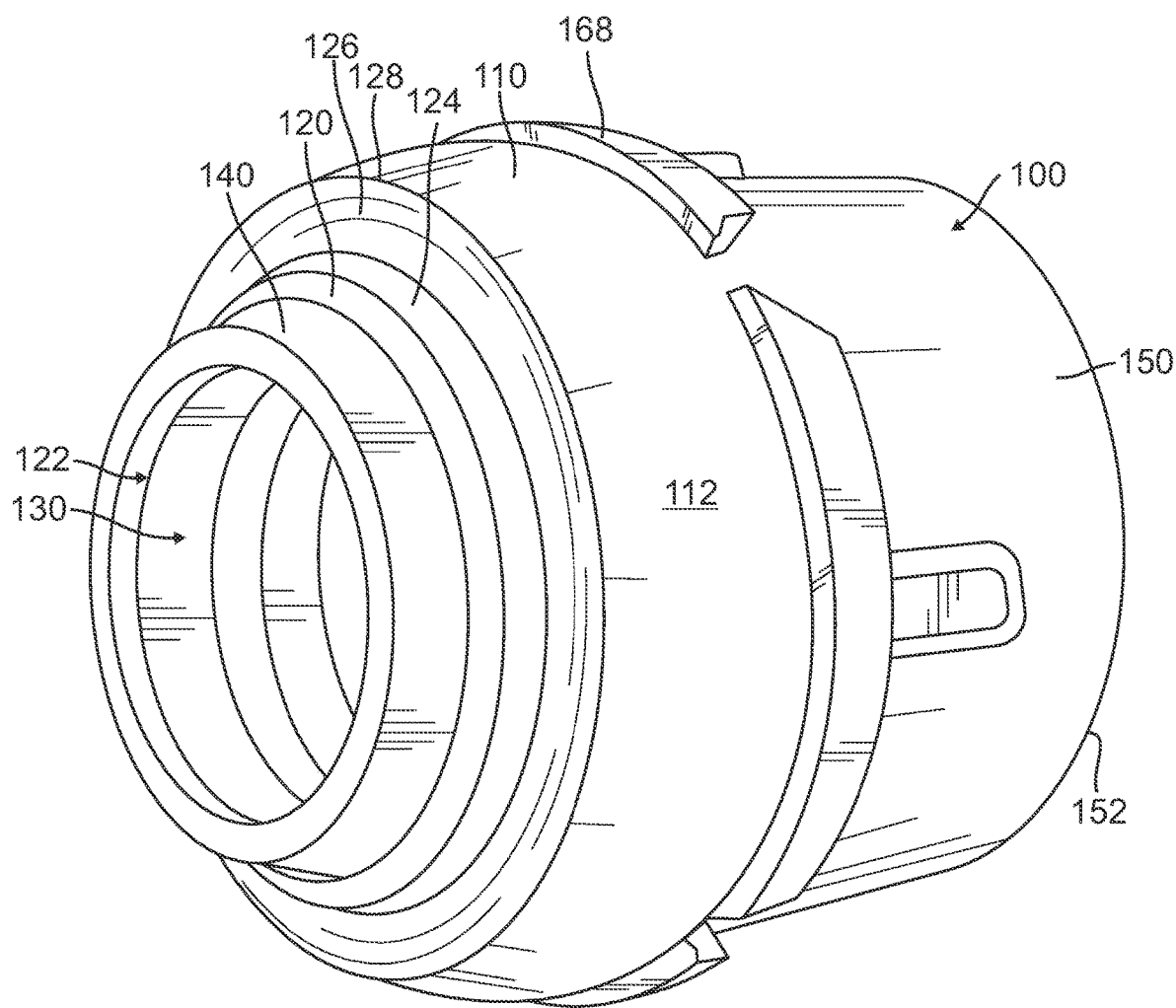
FIG. 2 is a front and side perspective view of the front portion of the first section of the present invention connector, the front portion including a spherical male exterior surface with a rounded leading edge.

Referring to FIG. 1, there is illustrated a front plan view of the front portion of the first section of the present invention connector, the front portion including a spherical male interior surface with a rounded leading edge. Referring to FIG. 2, there is illustrated a front and side perspective view of the front portion of the first section of the present invention connector, the front portion including a spherical male interior surface with a rounded leading edge.

Referring to FIGS. 1 and 2, the first section 100 includes an interior chamber 130 which extends through the entire interior of the first section 100 from a front open end 122 to a rear open end 152 and includes an expanded interior diameter as the interior chamber is surrounded by different interior diameter walls. The front portion of the interior chamber 130 is surrounded by a first front exterior wall 140 which has a rear portion which in turn is surrounded by a rounded male circular wall 120 having a male exterior surface 124. The rear portion of the interior chamber 130 is surrounded by a rear circumferential wall 150.

A key element of the first section is a spherical sidewall 110 which has a spherical male exterior surface 112 and a rounded leading edge 128. The rounded leading edge 128 is also connected to and extends around an exterior rear portion of the rounded male exterior wall 120.

At its rear end, the spherical sidewall 110 encircles a front portion of the rear circumferential wall 150. The spherical sidewall 110 allows the first section 100 to weld to a second section 200 and form a watertight seal even if first section 100 and second section 200 are not perfectly aligned during the spin welding process.

Figure 3:
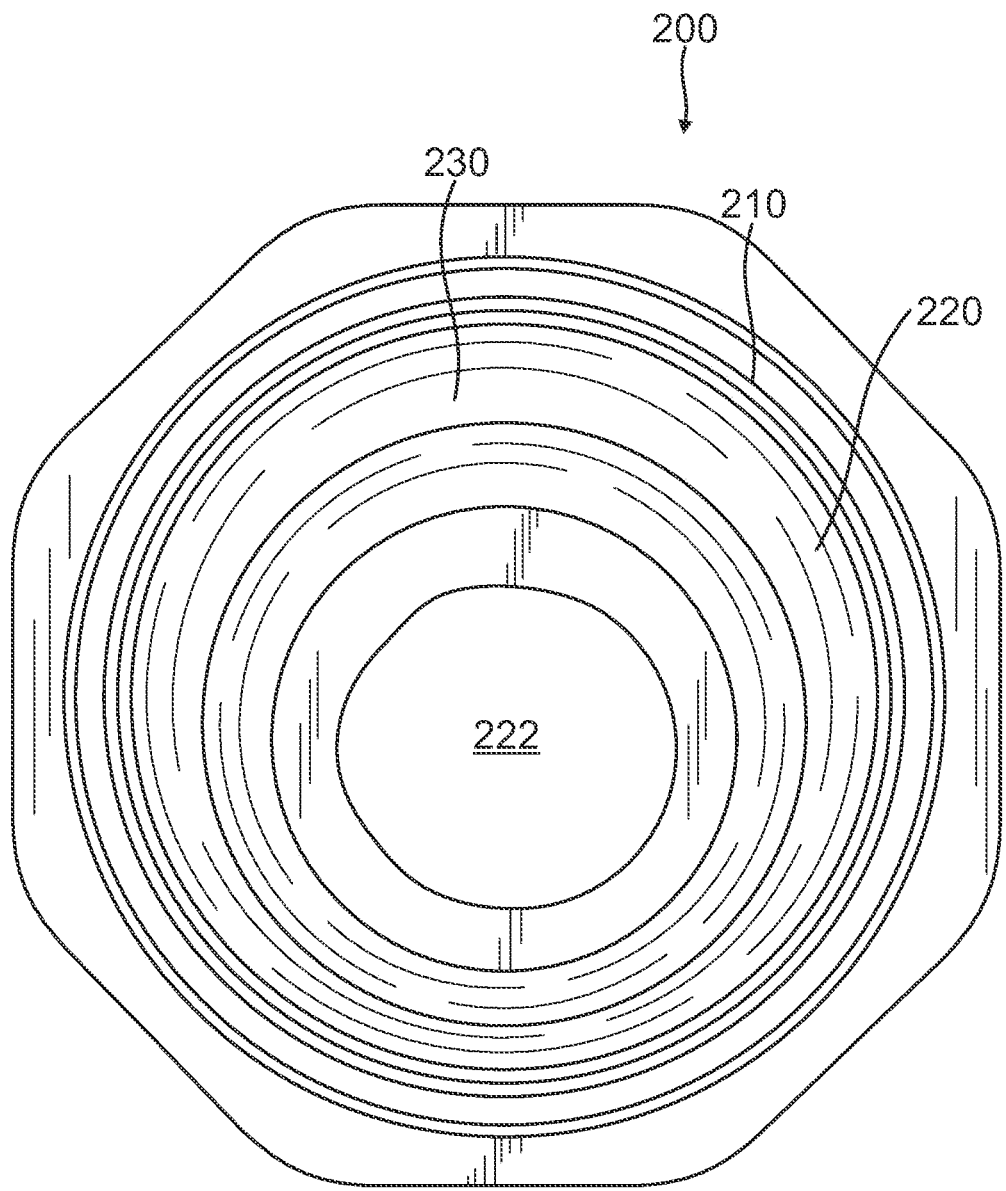
FIG. 3 is a rear plan view of the rear portion of the second section of the present invention connector, the rear portion including a female spherical interior wall with a spherical interior surface.
Figure 4:
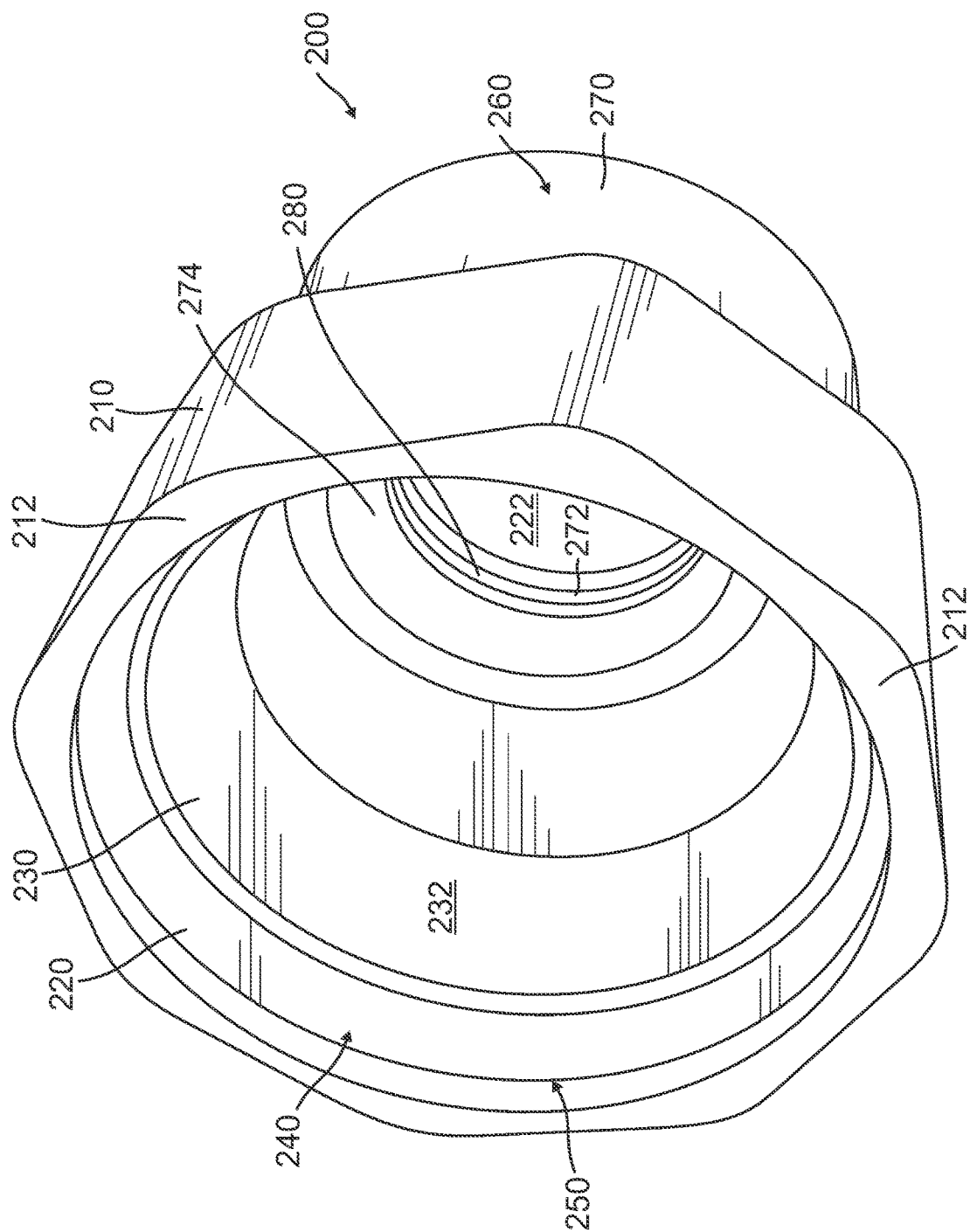
FIG. 4 is a rear exterior side and interior side perspective view of the second section of the present invention connector, the rear portion including a spherical female interior wall with a spherical interior surface, the front portion of the second section including interior female threads to receive male threads from a fire sprinkler head.

Referring to FIG. 3, there is illustrated a rear plan view of the rear portion of the second section 200 of the present invention connector. Referring to FIG. 4, there is illustrated a rear exterior side and interior side perspective view of the second section 200 of the present invention connector, the rear portion including a spherical female interior surface 232 with a spherical female interior wall 230. The front portion 260 of the second section 200 includes an exterior cylindrical front sidewall 270 and an interior surface 272 with interior female threads 280 to receive male threads from a fire sprinkler.

Referring to both FIGS. 3 and 4, the second section 200 includes a rear wall 210 surrounding a stepped interior wall 220 which leads to a spherical female interior wall 230 which has a spherical female interior surface 232. The spherical female interior wall 230 surrounds a rear opening 240 which is a portion of a rear interior chamber 250. The second section 200 has a front portion 260 with a cylindrical front sidewall 270 surrounding a first interior opening 222. Rear interior chamber 250 extends from first interior opening 222 on a first side to a rear interior opening 240 on a second and opposite side. Second section 200 also includes an interior sidewall 272 with mating interior female threads 280. Rear wall 210 extends to front portion 260 on one side and extends to a bottom surface 212 on an opposite side.

Figure 5:
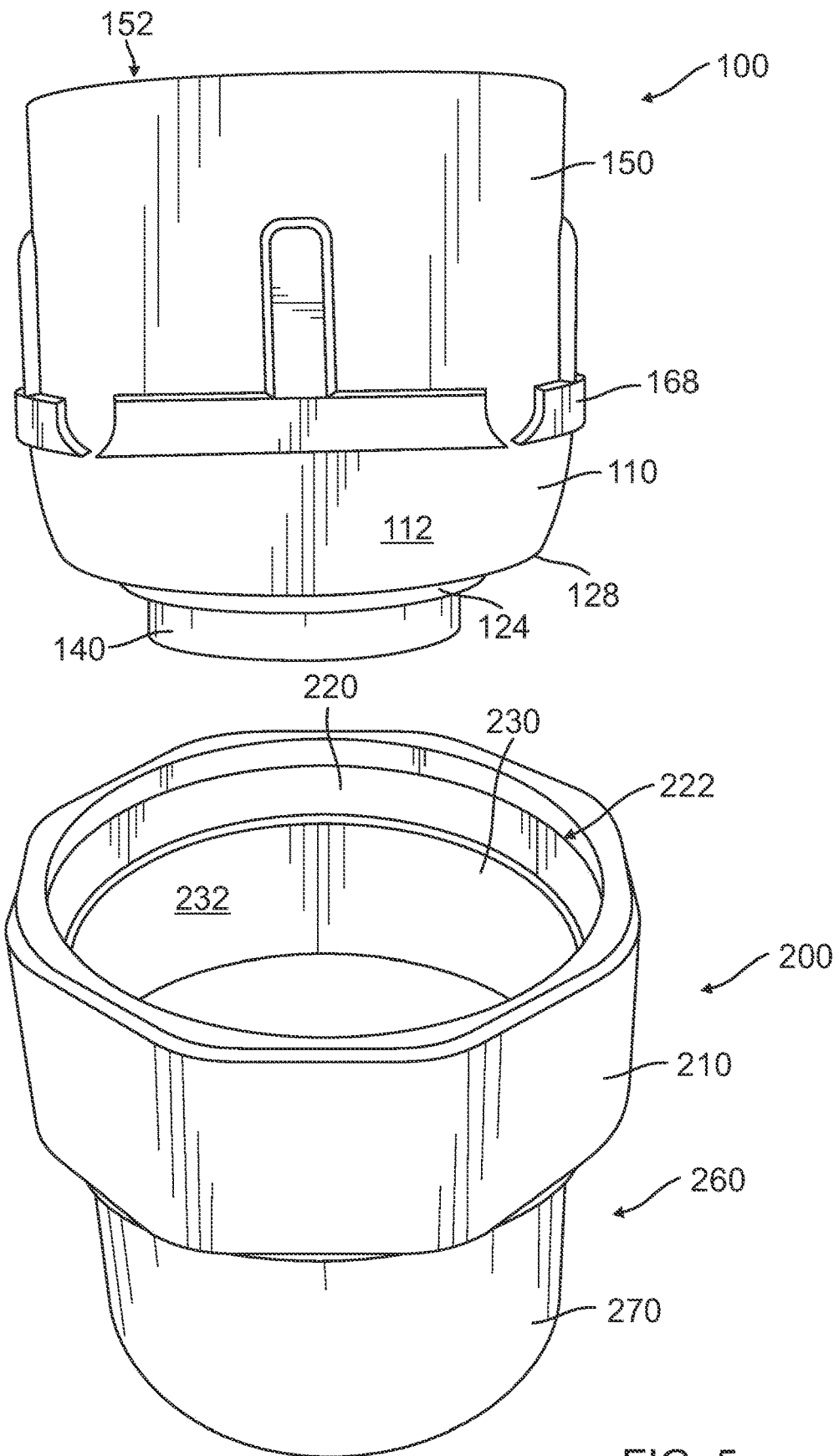
FIG. 5 is an exploded view of the first section above the second section.

Referring to FIG. 5, there is illustrated an exploded view of the first section 100 above the second section 200. The key innovation of the present invention is the combination of male section 100 spherical exterior sidewall 110 with a male rounded leading edge 128 which mates with the second section 200 spherical female interior wall 230 which has a spherical female interior surface 232. The male spherical wall combine with the spherical female interior wall and female interior surface to facilitate a welding connection between the first section 100 and the second section 200.

Figure 6A:
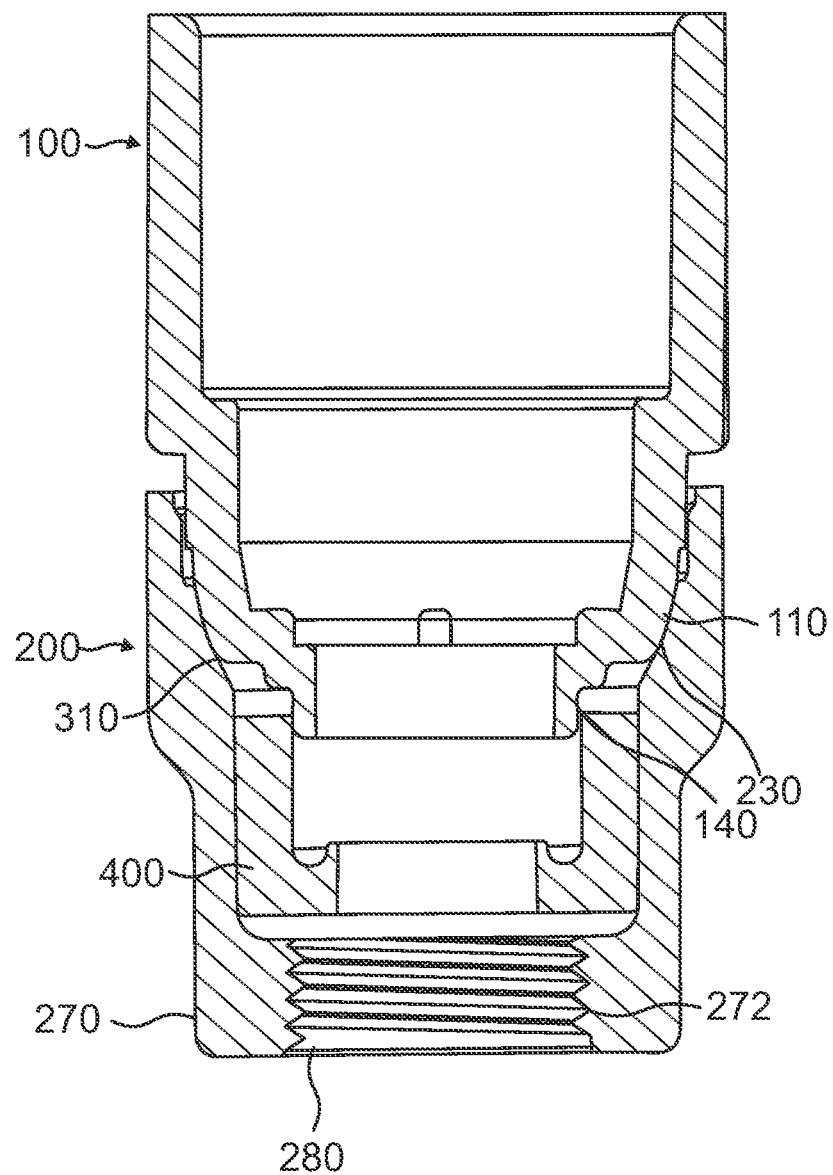
FIG. 6A is a cross-sectional view of the first section positioned to be spin welded to the second section wherein the two sections are axially aligned and positioned to be spin welded together.

Referring to FIG. 6A, there is illustrated a cross-sectional view of the first section 100 in the process of being spin welded to the second section 200 wherein the first section 100 and the second section 200 are axially aligned. FIG. 6A illustrates the first touch point 310 when the first section 100 begins to touch and begins to friction weld together with second section 200. When the second section 200 is rotated, spherical female wall 230 on second section 200 and a spherical wall 110 of first section 100 begin to touch surfaces and weld together. In the present invention spin welding process, either section can remain stationary while the second section is rotated so either the first section 100 can be stationary and the second section 200 rotated or the second section 200 stationary and the first section 100 is rotated.

Further referring to FIG. 6A, as the two sections 100 and 200 are brought together, the friction is created by one rotating surface against the stationary surface which melts the material. The speed and force at which the two sections 100 and 200 are brought together, as well as the rotational speed, is closely regulated to melt the two touching surfaces and maintain some of the melting material between the two surfaces 112 and 232 (see FIG. 5) to create a weld. The rounded leading edge 128 of spherical wall 110 (see FIG. 5) facilitates maintaining the melt between surfaces. Also illustrated in FIG. 6A is the gasket 400 located between the second section 200, interior sidewall 272 and the first section front exterior wall 140. Also illustrated are front mating threads 280 within interior surface 272 surrounded by exterior wall 270.

Further referring to FIG. 6A, there is illustrated the first touch point 310 when the first section 100 begins to touch and begins to friction weld together with second section 200. When the second section 200 is rotated, spherical female wall 230 on second section 200 and a spherical wall 110 of first section 100 begin to touch surfaces and weld together. In the present invention spin welding process, either section can remain stationary while the second section is rotated so either the first section 100 can be stationary and the second section 200 rotated or the second section 200 stationary and the first section 100 is rotated.

Figure 6B:
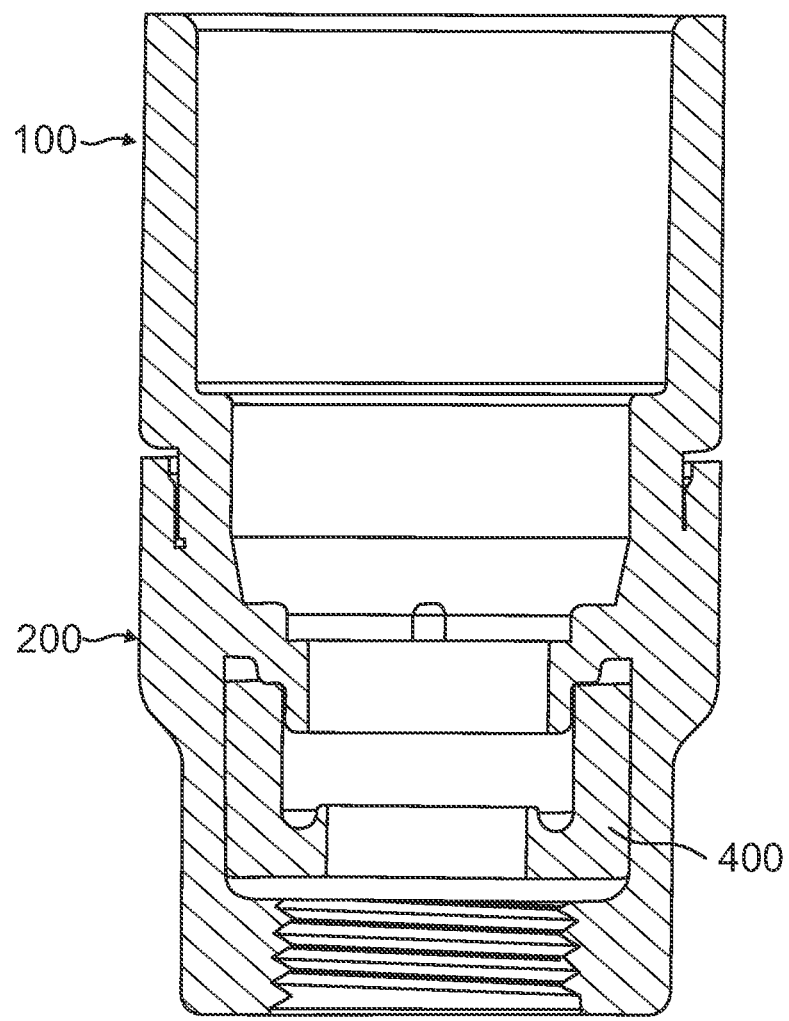
FIG. 6B is a cross-sectional view of the first section and the second section as originally illustrated in FIG. 6A, after the two sections have been spin welded together to create a homogeneous single section.

Referring to FIG. 6B, there is illustrated the complete weld between first section 100 and second section 200 wherein the gasket 400 is now fully between the interior sidewall 272 of second section 200 and the first section front exterior wall 140. Both the first section 100 and the second section 200 are axially aligned after the spin weld to show a very complete leakproof connection with the gasket assuring the leakproof connection as the gasket is perfectly captured between the first section 100 and the second section 200.

After sufficient time or sufficient axial movement has occurred to thoroughly melt the two surfaces together, the rotation stops and the two sections are held together without movement until the melted material has solidified and cooled.

Figure 7A:
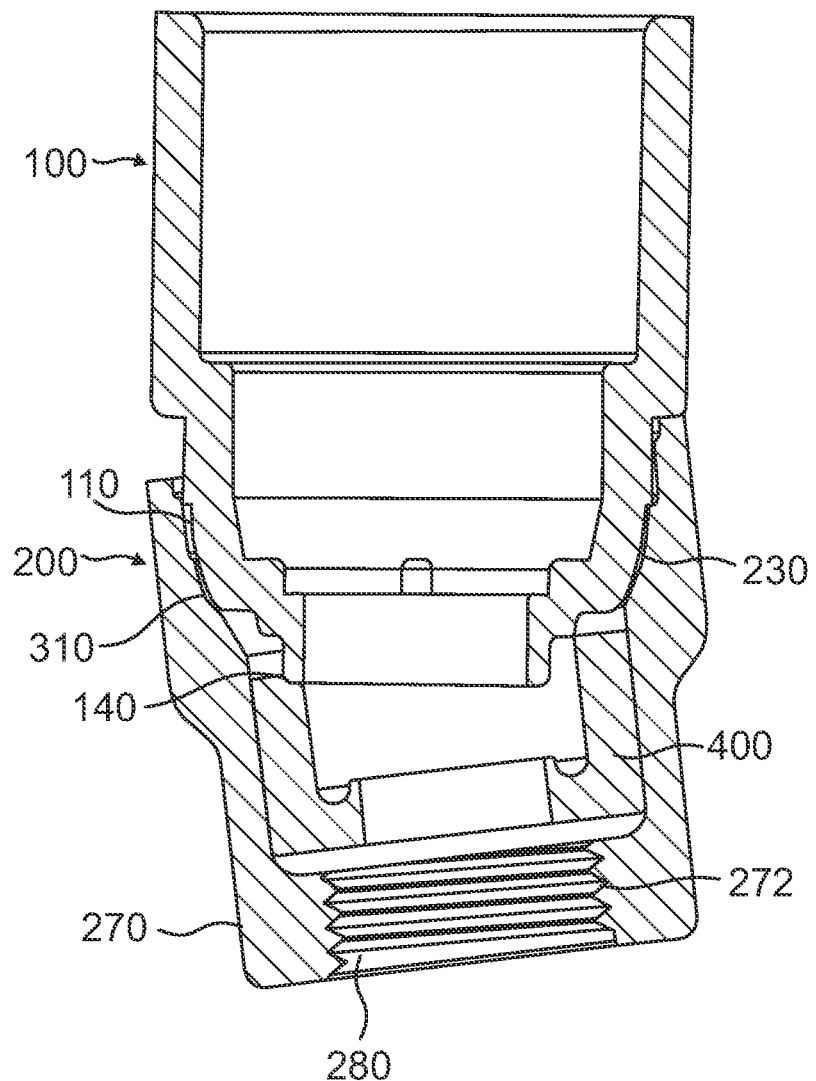
FIG. 7A is a cross-sectional view of the first section positioned to be spin welded to the second section wherein the two sections are axially misaligned prior to being spin welded together.

Referring to FIG. 7A, there is illustrated a cross-sectional view of the first section 100 in the process of being spin welded to the second section 200 wherein the first section 100 is axially misaligned with the second section 200. The misalignment is at an acute angle creating a large axial misalignment. Once again, FIG. 7A shows the spin welding beginning with the following components.

Figure 7B:
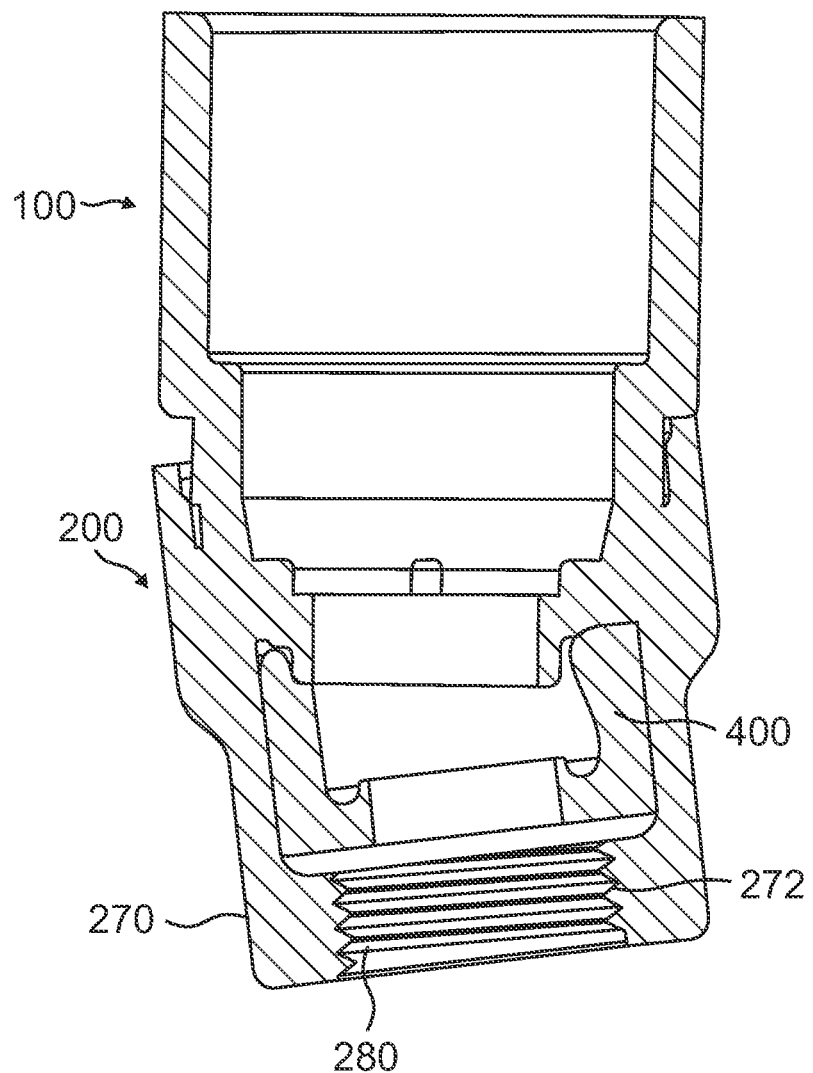
FIG. 7B is a close-up cross-sectional view of the two sections as illustrated in FIG. 7A after having been spin welded together in a misaligned state.

Referring to FIG. 7B, there is illustrated the final weld assembly of the first section 100 to the second section 200 that is leakproof and strong enough to resist the stress caused by the fluid pressure. The gasket 400 is distorted by the first section 100 displacing a portion of it but the end of the seal against the sprinkler head 500 remains shaped correctly. Therefore, as previously stated, the benefit of having the spherical surfaces on the first section and the second section enables a leakproof weld to be created even if there is a misalignment Referring to FIG. 8, there is demonstrated two critical surface areas; surface area 112 which is the male exterior surface 112 of section 100 and female interior surface 232 for the spherical female wall of section 200. A chord of a circle is a straight line segment whose end points both lie on the circle. Referring to FIG. 8, the angle of the chord that defines the walls of surfaces 112 male and 232 female with respect to center line as 0 is an angle Theta. Also shown in this illustration is the chord angle which is identical for both if the first section and second section are aligned or misaligned. As illustrated in FIG. 8, the chord angle is from 5 degrees to 75 degrees for the angle Theta which is the angle relative to the connecting surfaces compared to the center line 0. The angle is marked as Theta.

Figure 9:
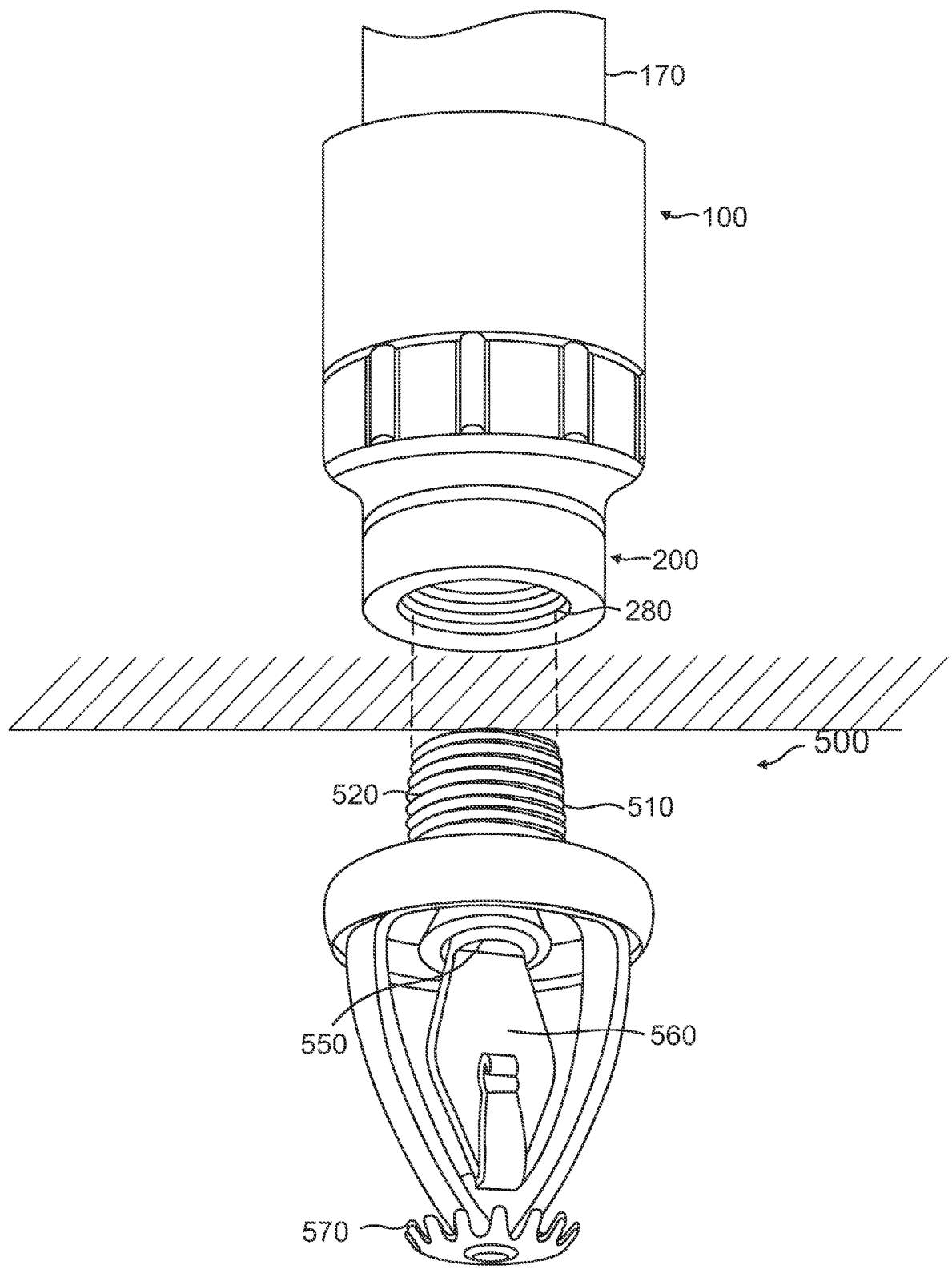
FIG. 9 is a perspective view of the fully welded fitting installed above a ceiling, with the first section connected to the supply pipe and the second section connected to the fire sprinkler and the fire sprinkler extending below the ceiling.

Referring to FIG. 9, there is illustrated a perspective view of the first section 100 connected to the second section 200 and installed in a ceiling positioned entirely above the ceiling and the second section 200 having an upper connection portion above the ceiling and the lower portion having threads 280 terminating just above the ceiling. From this view, it is shown that in the finished condition, first section 100 is above the ceiling and is connected to a supply pipe 170 on one side and section 200 on the second side. Supply pipe 170 is connected through interim pipes to a source of water. Further, it is illustrated that a user can connect upper end 510 of fire sprinkler 500 to threads 280 at the bottom portion 282 of second section 200. Also illustrated in FIG. 9 is an exploded view of a fire sprinkler 500 which includes an upper end 510 with male threads 520 that are threaded into female mating threads 280. The fire sprinkler 500 includes the central opening 550 within upper end 510 leading to a seal and operating mechanism 560 leading to a spray deflector 570 in fire sprinkler 500. The upper end includes a central opening 550 surrounded by upper wall 510 having male exterior threads 520 which are threaded into female mating threads 280.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A pipe connector comprising:
   (a) a first section including a first interior chamber extending through the first section and a spherical exterior sidewall extending around a front exterior portion of the first section;
   (b) a second section including a second interior chamber extending through the second section, the second interior chamber having a spherical female interior surface leading to a cylindrical interior surface with female interior threads;
   (c) wherein the spherical exterior sidewall of the first section mates with the spherical female interior wall of the second section by a spin weld between the first section and the second section; and
   (d) a gasket disposed between a front wall of the first section and the interior surface of the second section.

2. The pipe connector of claim 1, wherein: the interior female threads in the cylindrical interior surface are configured to receive and retain male threads of a fire sprinkler.

3. The pipe connector of claim 1, wherein: a front portion of the first interior chamber is sized to receive a supply pipe from a source of water.

4. The pipe connector of claim 1, wherein: the first section is spin welded to the second section with one of the first and second sections stationary and the other of the first and second sections rotatably spun to create the spin weld.

5. The pipe connector of claim 1, wherein: the first section is spin welded to the second section with the first and second sections axially misaligned.

6. The pipe connector of claim 5, wherein: the first section is spin welded to the second section with an axial misalignment angle between five degrees and seventy five degrees.

7. A pipe connector comprising:
(a) a first section including at least a spherical exterior rounded sidewall;
(b) a second section including a spherical rounded female interior surface; and
(c) the spherical exterior rounded sidewall of the first section mated with the spherical rounded female interior surface of the second section by a spherical spin weld between the first section and the second section;
(d) a gasket located between the first section and the second section.

8. The pipe connector of claim 7, wherein: the first section includes a first section interior connecting chamber sized to receive a front portion of a water supply pipe.

9. The pipe connector of claim 7, wherein: the second section includes a front portion with a cylindrical front sidewall surrounding a front interior cylindrical chamber with interior female threads configured to receive and retain male threads of a fire sprinkler.

10. The pipe connector of claim 7, wherein: the first section is axially aligned with the second section and coupled to the second section by the spherical spin weld.

11. The pipe connector of claim 7, wherein: the second section includes interior female threads to receive and retain male threads of a fire sprinkler.

12. The pipe of claim 7, wherein: the first section was spin welded to the second section by the spherical exterior rounded sidewall of the first section being inserted into the spherical rounded female interior surface of the second section and rotated relative to the female section, the female section remaining substantially stationary during the rotation.

13. The pipe connector of claim 7, wherein: the first section was spin welded to the second section by the spherical exterior rounded sidewall of the first section being inserted into the spherical rounded female interior surface of the second section, with the male section remaining substantially stationary and the female section rotated relative to the male section.

14. The pipe connector of claim 7, wherein: the first section is axially misaligned relative to the second section and coupled to the second section by the spherical spin weld.

15. The pipe connector of claim 7, wherein: the first section is spin welded to the second section with the spherical exterior rounded sidewall of the first section and the spherical rounded female interior surface of the second section having an axial misalignment angle between five degrees and seventy five degrees.

* * * * *